(12) United States Patent
Iwamoto

(10) Patent No.: US 6,501,598 B2
(45) Date of Patent: Dec. 31, 2002

(54) PRISM AND OPTICAL DEVICE USING THE SAME

(75) Inventor: Hiromi Iwamoto, Osaka (JP)

(73) Assignee: Sumitomo Electric Industries, Tld., Osaka (JP)

( * ) Notice: Subject to any disclaimer, the term of this patent is extended or adjusted under 35 U.S.C. 154(b) by 0 days.

(21) Appl. No.: 09/923,455

(22) Filed: Aug. 8, 2001

(65) Prior Publication Data

US 2002/0039234 A1 Apr. 4, 2002

(30) Foreign Application Priority Data

Aug. 8, 2000 (JP) .................................... 2000-239731

(51) Int. Cl.[7] .............................. G02B 5/04; G02B 5/28; G02B 1/11; H01S 3/08
(52) U.S. Cl. ...................... 359/359; 359/350; 359/351; 359/580; 359/586; 359/831; 359/837; 372/100
(58) Field of Search ................................ 359/359, 350, 359/351, 580, 581, 586, 831, 837; 372/100, 98, 20

(56) References Cited

U.S. PATENT DOCUMENTS

| | | | | |
|---|---|---|---|---|
| 3,936,136 A | * | 2/1976 | Ikeda et al. ................. | 359/359 |
| 5,885,712 A | * | 3/1999 | Otani et al. ................. | 423/625 |
| 5,898,725 A | * | 4/1999 | Fomenkov et al. .......... | 372/102 |
| 5,978,409 A | * | 11/1999 | Das et al. .................... | 372/100 |
| 6,238,479 B1 | * | 5/2001 | Oba ............................. | 117/68 |
| 2001/0050762 A1 | * | 12/2000 | Mulkens et al. ............. | 355/67 |
| 2002/0012374 A1 | * | 1/2001 | Basting ........................ | 372/55 |
| 2001/0031543 A1 | * | 3/2001 | Ando et al. .................. | 438/485 |

FOREIGN PATENT DOCUMENTS

| | | |
|---|---|---|
| JP | 07-244205 A * | 9/1995 |
| JP | 07-244217 A * | 9/1995 |
| JP | 10-253802 | 9/1998 |
| JP | 10-268106 | 10/1998 |
| JP | 11-064604 | 3/1999 |
| JP | 11-264903 A * | 9/1999 |

OTHER PUBLICATIONS

Glen P. Callahan, and Bruce K. Flint, "Characteristics of Deep UV Optics at 193nm & 157nm," Part of the Symposium on Laser–Induced Damage In Optical Materials: 1998, Boulder, Colorado, Sep.–Oct. 1998, pp. 45–53.

Doug J. Krajnovich, M. Kulkarni, W. Leung, A.C. Tam. A. Spool, and B. York, "Testing Of The Durability Of Single–Crystal Calcium Fluoride With And Without Antireflection Coatings For Use With High–Power KrF Excimer Lasers," Applied Optics, vol. 31, No. 28, Oct. 1, 1992, pp. 6062–6075.

* cited by examiner

Primary Examiner—John Juba, Jr.
(74) Attorney, Agent, or Firm—McDermott, Will & Emery

(57) ABSTRACT

A prism includes a prism base member having first and second faces intersecting with each other and including calcium fluoride, an antireflection film for oblique incidence formed on the first face of the prism base member, and an antireflection film for 0° incidence formed on the second face of the prism base member. Each of the antireflection film for oblique incidence and the antireflection film for 0° incidence includes a high-refractive-index layer with a relatively high refractive index, and a low-refractive-index layer with a relatively low refractive index. The high-refractive-index layer includes thorium fluoride and the low-refractive-index layer includes aluminum fluoride.

32 Claims, 3 Drawing Sheets

PRISM AND OPTICAL DEVICE USING THE SAME

BACKGROUND OF THE INVENTION

1. Field of the Invention

The present invention generally relates to a prism and an optical device using the same. More specifically, the present invention relates to a prism used as an optical element for narrowing the wavelength band in an ultraviolet laser light source, and to an optical device such as a resonator using such a prism.

2. Description of the Background Art

In recent years, owing to improved resolution in photolithography using light, semiconductor devices have been provided with a higher degree of integration and performance. The development of submicron lithography with use of a reducing projection aligner is, in one aspect, directed to reduction in the wavelength of light employed.

Lithography using an excimer laser as a light source with a short wavelength has been employed. More specifically, as steppers using a KrF laser light source with a wavelength of 248 nm are put into practical use and resolution in lithography improves, the memory storage capacity of a semiconductor integrated circuit device and the clock frequency of a CPU (Central Processing Unit) are remarkably increased. Most recently, a stepper using an ArF laser light source with a wavelength of 193 nm is being developed. This type of stepper enables fine patterning allowing a line width of as small as 0.13–0.11 μm. Accordingly, to enable the manufacture a dynamic random access memory (DRAM) having a storage capacity of 1-Gbit, the practical use of the stepper using the ArF laser light source is expected.

The stepper requires, as an exposure light source, a monochromatic laser beam with an extremely small line width and, more specifically a laser beam with a laser oscillation output of at most 20 W, laser oscillation frequency of 4 kHz, and laser oscillation spectrum with a full width at half maximum of at most 0.5 pm. To obtain this type of laser beam, an enlargement prism is inserted in a resonator of the exposure light source along with a diffraction grating as an optical element for narrowing the wavelength band. This enables selection of dispersed laser beams with different wavelengths and enlargement of laser beam, so that a monochromatic output laser beam is obtained.

Under the circumstance, there is a need for a prism with high transmittance which is capable of narrowing the wavelength band of a laser light source with a wavelength of at most 200 nm such as an ArF laser light source without decreasing laser energy efficiency.

A structure of an antireflection film having an antireflection effect against incident light in a deep ultraviolet region with respect to an optical element has been proposed in Japanese Patent Laying-Open No. 10-253802, No. 10-268106, and No. 11-64604. However, these laid-open applications merely disclose a structure of an antireflection film with reduced reflectance, but not with high transmittance. In addition, although the above laid-open applications have proposed a structure of an antireflection film used for an optical element such as a lens in an optical system including a stepper, for example, they do not disclose a structure of an antireflection film which is most suitable for a specific optical element, i.e., a prism.

SUMMARY OF THE INVENTION

An object of the present invention is to provide a prism provided with an antireflection film with high transmittance capable of narrowing the wavelength band of a laser light source with a wavelength of at most 200 nm without lowering laser energy efficiency, and to an optical device using the same.

First of all, the present inventor has noted that transmittance T(%) can be expressed by the equation T(%)=100−α(%)=R(%) (α: absorptance, R: reflectance). According to the equation, absorptance α must be reduced along with reflectance R to achieve high transmittance T. Then, the present inventor has studied the structure of an antireflection film which provides not only low reflectance but also low absorptance. In the course of study, the inventor has found not only a precise refractive index n(λ) but also a precise extinction coefficient (λ) in the region with a wavelength λ of at most 200 nm as optical constants of a material for the antireflection film.

As a result, the present inventor has found that a prism with high transmittance can be obtained by forming an antireflection film, formed of a combination of a layer including thorium fluoride ($ThF_4$) with relatively high refractive index and a layer including aluminum fluoride ($AlF_3$) with relatively low refractive index, on a base member including calcium fluoride ($CaF_2$).

In addition, the present inventor has found that thorium fluoride ($ThF_4$) and aluminum fluoride ($AlF_3$) exhibit relatively high affinity with respect to calcium fluoride ($CaF_2$) as compared with other film materials, and hence exhibit relatively high adhesion with respect to a prism base member including calcium fluoride ($CaF_2$).

Therefore, the prism according to the present invention has a base member including calcium fluoride with first and second faces intersecting with each other, a first antireflection film formed on the first face of the base member, and a second antireflection film formed on the second face of the base member. Each of the first and second antireflection films has a high-refractive-index layer with a relatively high refractive index, and a low-refractive-index layer with a relatively low refractive index. The high-refractive-index layer includes thorium fluoride, and the low-refractive-index layer includes aluminum fluoride.

In the above mentioned prism, in the case where a laser beam is incident upon the first face and emitted from the second face of the base member, there would not be a considerable decrease in laser energy efficiency when the laser beam passes through the first and second antireflection films because of high transmittance of the first and second antireflection films. Thus, the prism with high transmittance can be obtained.

In the above mentioned prism, the outermost surfaces of the first and second antireflection films preferably include aluminum fluoride. In this case, the outermost layer including aluminum fluoride serves as a protection layer against the moisture environment in which the prism is located. Thus, the prism with excellent environmental resistance can be obtained.

Further, in the above mentioned prism, each of the first and second antireflection films preferably include a high-refractive-index layer and low-refractive-index layer which are alternately layered.

In the prism of the present invention, the high-refractive-index layer and low-refractive-index layer preferably have optical film thicknesses of $0.29\lambda/4$–$1.25\lambda/4$ and $0.29\lambda/4$–$2.25\lambda/4$ with respect to any design basis wavelength λ of at most 200 nm, respectively.

In the prism of the present invention, the first antireflection film may include an odd number of layers with the low-refractive-index layer arranged immediately on the first face of the base member and the low-refractive-index layer arranged as the outermost surface of the first antireflection film. Alternatively, the first antireflection may include an even number of layers with the high-refractive-index layer arranged immediately on the first face of the base member and the low-refractive-index layer as the outermost surface of the first antireflection film.

When the first antireflection film includes an even number of layers, preferably, it has any of the following structures to maximize transmittance.

(1) The first antireflection film includes first and second layers successively formed on the base member side. The first and second layers have optical film thicknesses of $0.88\lambda/4-0.95\lambda/4$ and $0.29\lambda/4-0.32\lambda/4$ with respect to any design basis wavelength $\lambda$ of at most 200 nm, respectively.

(2) The first antireflection film includes first to fourth layers successively formed on the base member side. The first to fourth layers have optical film thicknesses of $1.15\lambda/4-1.22\lambda/4$, $1.37\lambda/4-1.40\lambda/4$, $0.88\lambda/4-0.96\lambda/4$, and $0.29\lambda/4-0.32\lambda/4$ with respect to any design basis wavelength $\lambda$ of at most 200 nm, respectively.

(3) The first antireflection includes first to sixth layers successively formed on the base member side. The first to sixth layers have optical film thicknesses of $1.02\lambda/4-1.22\lambda/4$, $1.39\lambda/4-1.47\lambda/4$, $1.08\lambda/4-1.22\lambda/4$, $1.39\lambda/4-1.48\lambda/4$, $0.84\lambda/4-0.95\lambda/4$, and $0.29\lambda/4-0.32\lambda/4$ with respect to any design basis wavelength $\lambda$ of at most 200 nm, respectively.

(4) The first antireflection film includes first to eighth layers successively formed on the base member side. The first to eighth layers have optical film thicknesses of $0.34\lambda/4-1.21\lambda/4$, $1.40\lambda/4-1.70\lambda/4$, $0.80\lambda/4-1.22\lambda/4$, $1.40\lambda/4-1.80\lambda/4$, $0.79\lambda/4-1.22\lambda/4$, $1.40\lambda/4-1.81\lambda/4$, $0.70\lambda/4-0.95\lambda/4$, and $0.29\lambda/4-0.32\lambda/4$ with respect to any design basis wavelength $\lambda$ of at most 200 nm, respectively.

(5) The first antireflection film includes first to tenth layers successively formed on the base member side. The first to tenth layers have optical film thicknesses of $0.34\lambda/4-1.20\lambda/4$, $1.41\lambda/4-1.94\lambda/4$, $0.45\lambda/4-1.21\lambda/4$, $1.41\lambda/4-2.20\lambda/4$, $0.49\lambda/4-1.21\lambda/4$, $1.42\lambda/4-2.09\lambda/4$, $0.58\lambda/4-1.20\lambda/4$, $1.42\lambda/4-1.99\lambda/4$, $0.63\lambda/4-0.94\lambda/4$, and $0.29\lambda/4-0.32\lambda/4$ with respect to any design basis wavelength $\lambda$ of at most 200 nm, respectively.

In the prism of the present invention, the first antireflection film may include an odd number of layers with the low-refractive-index layer arranged immediately on the first face of the base member and the low-refractive-index layer arranged as the outermost surface of the first antireflection film. Alternatively, the first antireflection may include an even number of layers with the high-refractive-index layer arranged immediately on the first face of the base member and the low-refractive-index layer arranged as the outermost surface of the first antireflection film.

The second antireflection film preferably includes any of the following structures to maximize transmittance.

(a) The second antireflection film includes first and second layers successively formed on the base member side. The first and second layers have optical film thicknesses of $0.95\lambda/4-1.01\lambda/4$ and $0.98\lambda/4-1.04\lambda/4$ with respect to any design basis wavelength $\lambda$ of at most 200 nm, respectively.

(b) The second antireflection film includes first to third layers successively formed on the base member side. The first to third layers have optical film thicknesses of $1.38\lambda/4-1.46\lambda/4$, $0.80\lambda/4-0.84\lambda/4$, and $0.96\lambda/4-1.02\lambda/4$ with respect to any design basis wavelength $\lambda$ of at most 200 nm, respectively.

(c) The second antireflection includes first to fourth layers successively formed on the base member side. The first to fourth layers have optical film thicknesses of $0.66\lambda/4-0.70\lambda/4$, $0.79\lambda/4-0.83\lambda/4$, $0.66\lambda/4-0.70\lambda/4$, and $1.30\lambda/4-1.35\lambda/4$ with respect to any design basis wavelength $\lambda$ of at most 200 nm, respectively.

(d) The second antireflection film includes first to fifth layers successively formed on the base member side. The first to fifth layers have optical film thicknesses of $2.07\lambda/4-2.19\lambda/4$, $0.33\lambda/4-0.35\lambda/4$, $1.55\lambda/4-1.65\lambda/4$, $0.76\lambda/4-0.80\lambda/4$, and $0.98\lambda/4-1.04\lambda/4$ with respect to any design basis wavelength $\lambda$ of at most 200 nm, respectively.

Note that the above defined range for optical film thickness of each layer is determined taking into account a thickness controlling range for practical film formation with respect to optimum design thickness that may provide optimum transmittance.

According to a preferred embodiment of the prism of the present invention, the first antireflection film includes any number of layers selected from a group of two, four, six, eight, and ten layers with the high-refractive-index layer arranged immediately on the first face of the base member and the low-refractive-index layer arranged as the outermost surface of the first antireflection film. The second antireflection film includes any number of layers selected from a group of two, three, four, and five layers with the low-refractive-index layer arranged as the outermost surface of the second antireflection film.

To maximize the effect of the present invention, the prism of the present invention is preferably a right-angle prism.

Further, to maximize the effect of the present invention, the prism of the present invention is preferably used such that light with incident angle of 65–80° is incident upon the first face of the base member and light with incident angle of 0° is incident upon the second face of the base member.

An optical device according to another aspect of the present invention uses the above described prism as an optical element for narrowing an excimer laser beam with a wavelength of at most 200 nm. The optical device is preferably a laser resonator. Generally, at least three prisms are used for narrowing wavelength band in a grating method. Thus, if transmittance per prism is increased by 1–2%, efficiency (transmittance) of the narrowing unit increases by 3–6%, which would be a considerable contribution to a laser output. As a result, a laser input value can be decreased, whereby the useful life of components in the resonator, such as an optical component, electrode and laser gas, may be prolonged, and a laser beam may be effectively narrowed.

According to the present invention, the prism with higher transmittance than the conventional prism can be provided. By forming the outermost surface of the antireflection film with aluminum fluoride, the prism may be provided with excellent environmental resistance. Further, the optical device using the prism of the present invention restrains an output loss of light. For example, the use of the prism of the present invention in the resonator for narrowing the wavelength band of excimer laser beam enables effective narrowing of the band without lowering laser energy efficiency.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
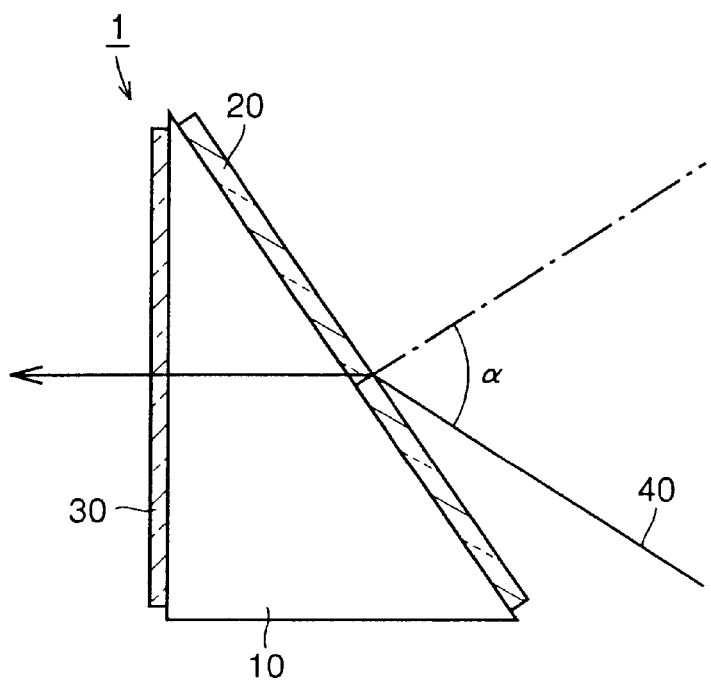
FIG. 1 is a cross sectional view schematically showing a prism according to one embodiment of the present invention.

As shown in FIG. 1, a prism 1 is a right-angle prism. A prism base member 10 includes calcium fluoride ($CaF_2$), forming the right-angle prism. An antireflection film for oblique incidence 20 and an antireflection film for 0° incidence 30, respectively first and second antireflection films, are formed on two faces which are intersecting at a vertical angle of prism base member 10. Antireflection film for oblique incidence 20 and antireflection film for 0° incidence 30 are formed by layering a high-refractive-index layer including thorium fluoride ($ThF_4$) and a low-refractive-index layer including aluminum fluoride ($AlF_3$). Thus, an antireflection film with high transmittance is formed.

A laser beam with a wavelength of at most 200 nm, such as an ArF excimer laser with a wavelength of 193 nm, is incident upon antireflection for oblique incidence 20 which is formed on the first face of prism base member 10 at an incident angle α (65–80°). Incident laser beam 40 passes through prism base member 10 to be incident upon the surface of antireflection film for 0° incidence formed on the second face of prism base member 10 and then emitted from prism 1. The output beam width is greater than the input beam width. This enlargement prism and a Littrow reflective diffraction grating are used in combination for narrowing the wavelength band. Since the enlargement ratio of the beam is approximately proportional to a resolution, generally, at least three enlargement prisms are used to enlarge the laser beam to be incident upon the Littrow reflective diffraction grating for narrowing the wavelength band.

Figure 2:
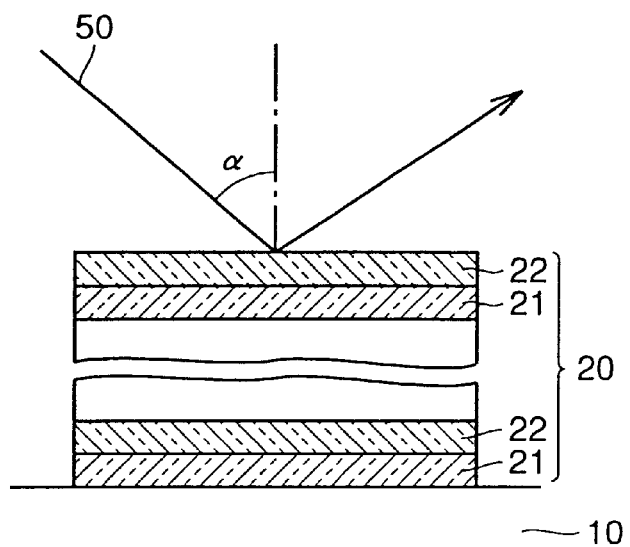
FIG. 2 is a cross sectional view schematically showing that an antireflection film for oblique incidence 20 of FIG. 1 includes an even number of layers.

FIG. 2 is a cross sectional view schematically showing that antireflection for oblique incidence 20 of FIG. 1 includes an even number of layers. As shown in FIG. 2, a thorium fluoride layer 21 is formed immediately on prism base member 10, and an aluminum fluoride layer 22 is formed as an outermost surface. Thorium fluoride layer 21 and aluminum fluoride layer 22 are successively formed. FIG. 2 shows that laser beam 50 is incident upon the outermost aluminum fluoride layer 22 at incident angle α and reflected.

Figure 3:
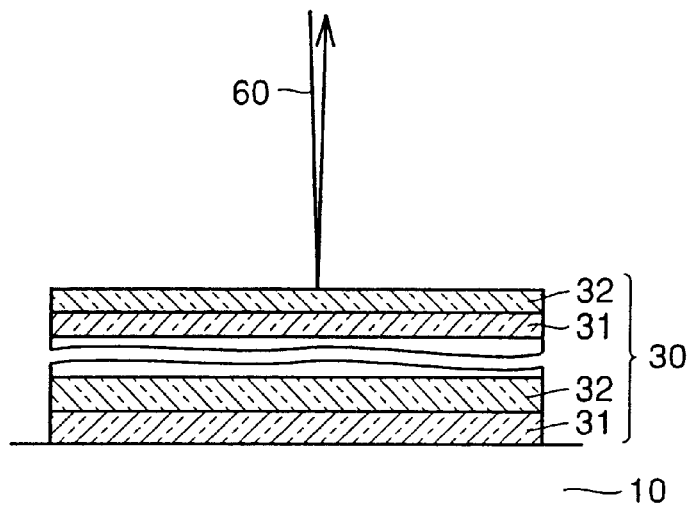
FIG. 3 is a cross sectional view schematically showing that an antireflection film for 0° incidence 30 of FIG. 1 includes an even number of layers.

FIG. 3 is a cross sectional view schematically showing that antireflection film for 0° incidence 30 of FIG. 1 includes an even number of layers. As shown in FIG. 3, a thorium fluoride layer 31 is formed immediately on prism base member 10 and an aluminum fluoride layer 32 is formed as an outermost surface. Thorium fluoride layer 31 and aluminum fluoride layer 32 are successively formed. FIG. 3 shows that laser beam 60 is incident upon the outermost aluminum fluoride layer 32 at incident angle 0° and reflected.

Note that although FIGS. 2 and 3 show antireflection films including thorium fluoride layer 21 or 31 arranged on the side of prism base member 10, aluminum fluoride layer 22 or 32 may be arranged on the side of prism base member 10. Although the antireflection films shown in FIGS. 2 and 3 provide enhanced resistance to moisture with aluminum fluoride layer 22 or 32 arranged as an outermost layer, thorium fluoride layer 21 or 31 may be arranged as an outermost layer for the sole purpose of increasing transmittance.

EXAMPLE

Antireflection film for oblique incidence 20 and antireflection film for 0° incidence 30 shown in FIGS. 1 to 3 were designed in the following way.

First of all, optical constants (refractive index n, extinction coefficient k) of the material for an antireflection film which can be used in a deep ultraviolet region for practical film formation were found in the following manner.

A sample was manufactured by forming a single-layer film with a thickness of about 0.5 μm at a substrate temperature of 250° C. on a quartz substrate, using thorium fluoride ($ThF_4$), lanthanum fluoride ($LaF_3$), yttrium fluoride ($YF_3$), magnesium fluoride ($MgF_2$), and aluminum fluoride ($AlF_3$) each having a purity of at least 99.99%, in addition to conventionally used materials. For each of thorium fluoride ($ThF_4$), magnesium fluoride ($MgF_2$), and aluminum fluoride ($AlF_3$), another sample is manufactured by forming similar single-layer film on a single-crystal substrate of calcium fluoride ($CaF_2$) for an ultraviolet region, and two samples were analyzed.

Using the samples thus obtained, optical constants (n, k) in a deep ultraviolet region (wavelength of 193 nm) of each film material were found by evaluation with use of an elliptical polarization analyzer (spectroellipsometer) and an optical spectral analyzer (nk analyzer). The result is shown in the following Table 1.

TABLE 1

| Material | Refractive Index n | Extinction Coefficient k |
| --- | --- | --- |
| $ThF_4$ | 1.634 | $3 \times 10^{-4}$ |
| $LaF_3$ | 1.675 | $2 \times 10^{-3}$ |
| $YF_3$ | 1.603 | $1.2 \times 10^{-3}$ |
| $MgF_2$ | 1.453 | $<10^{-5}$ |
| $AlF_3$ | 1.412 | $<10^{-5}$ |

As is apparent from Table 1, it is understood that thorium fluoride used for a high-refractive-index layer of the present invention has smaller extinction coefficient k in the deep ultraviolet region than lanthanum fluoride or yttrium fluoride which has been conventionally received a great deal of attention as an effective material. This means that thorium fluoride has smaller light absorptance in the deep ultraviolet region which adversely affects transmitting performance, than in the case of lanthanum fluoride or yttrium fluoride. In addition, in the present invention, aluminum fluoride used as a material for a low-refractive-index layer has smaller refractive index n than magnesium fluoride. This confirmed that an antireflection film with high transmittance can be obtained by using, as a combination of materials having considerably different refractive indices, thorium fluoride for a high-refractive-index layer with small light absorptance and aluminum fluoride for a low-refractive-index layer.

Then, based on the optical constants of the obtained film materials, an antireflection film including a combination of a thorium fluoride layer and an aluminum fluoride layer which would provide the optimum transmittance was designed in the following way.

i) Data of optical constants (n, k) of the prism base member (calcium fluoride) and film material (thorium fluoride and aluminum fluoride) used for the calculation are determined by the above described experiment or the like in connection with the subject wavelength region (180–500 nm).

ii) Using a commercially available simulation software capable of performing automatic optimizing calculation of an optical multilayer film, a model of the multilayered antireflection film is created, which includes a combination of the thorium fluoride layer and aluminum fluoride layer to be designed formed on a calcium fluoride substrate with no absorptance. Note that the aluminum fluoride layer with excellent resistance to moisture is formed as the outermost layer.

iii) Target values (wavelength, polarization type, incident angle, target transmittance value) are set by optimizing calculation to provide the maximum transmittance (100%) with the target wavelength (193 nm) and the wavelength band around the target wavelength. Note that the maximum and minimum film thicknesses allowing practical film formation are set as restricting conditions for each layer. The polarization type and incident angle are respectively p polarization and 65–80° in the case of the antireflection film for oblique incidence, and non-polarization and 0° in the case of the antireflection film for 0° incidence.

iv) An appropriate initial film thickness is input as a value of optical film thickness for each layer of the multilayered antireflection film, and the optimizing calculation is performed to provide a value which is as close as possible to the target transmittance value.

v) By appropriately changing the above mentioned initial thickness, transmittance characteristic is evaluated to ultimately determine an optimum design value (film thickness of each layer).

Table 2 shows the resulting structures of the antireflection film for 0° incidence and the maximum transmittance (wavelength of 193 nm) provided by each structure.

TABLE 2

|  |  | First layer | Second layer | Third layer | Fourth layer | Fifth layer | Sixth layer | transmittance T(%) |
|---|---|---|---|---|---|---|---|---|
| Two-layer film | OT | $ThF_4$ 0.98 | $AlF_3$ 1.005 | | | | | 99.49 |
| Three-layer film | OT | $AlF_3$ 1.416 | $ThF_4$ 0.8185 | $AlF_3$ 0.9896 | | | | 99.92 |
| Four-layer film | OT | $ThF_4$ 0.677 | $AlF_3$ 0.808 | $ThF_4$ 0.677 | $AlF_3$ 1.336 | | | 99.91 |
| Five-layer film | OT | $AlF_3$ 2.1295 | $ThF_4$ 0.3387 | $AlF_3$ 1.6024 | $ThF_4$ 0.7768 | $AlF_3$ 1.0093 | | 99.92 |
| Six-layer film | OT | $ThF_4$ 0.339 | $AlF_3$ 2.282 | $ThF_4$ 0.406 | $AlF_3$ 1.422 | $ThF_4$ 0.762 | $AlF_3$ 1.045 | 99.9 |

NOTE)
OT represents an optical film thickness measured in terms of one-quarter of a wavelength $\lambda$(193 nm), i.e., ($\lambda/4$).

As can be understood from Table 2, if the antireflection film for 0° incidence includes at least six layers, the value of maximum transmittance becomes saturated. Accordingly, the film is preferably formed of at most five layers.

Tables 3, 4, and 5 respectively show the structure of an antireflection (AR) film for oblique incidence which has been designed as described above with incident angles of 70°, 73°, and 75°, and maximum transmittances (wavelength of 193 nm) obtained by respective structures.

TABLE 3

| In the case of AR film for 70° incidence | | | | | | | | | | | |
|---|---|---|---|---|---|---|---|---|---|---|---|
| Two-layer film | $ThF_4$ | $AlF_3$ | Transmittance T(%) | | | | | | | | |
| OT | 0.90 | 0.29 | 96.67 | | | | | | | | |
| Four-layer film | $ThF_4$ | $AlF_3$ | $ThF_4$ | $AlF_3$ | Transmittance T(%) | | | | | | |
| OT | 1.18 | 1.37 | 0.91 | 0.29 | 98.22 | | | | | | |
| Six-layer film | $ThF_4$ | $AlF_3$ | $ThF_4$ | $AlF_3$ | $ThF_4$ | $AlF_3$ | Transmittance T(%) | | | | |
| OT | 1.15 | 1.40 | 1.17 | 1.40 | 0.90 | 0.29 | 99.22 | | | | |
| Eight-layer film | $ThF_4$ | $AlF_3$ | $ThF_4$ | $AlF_3$ | $ThF_4$ | $AlF_3$ | $ThF_4$ | $AlF_3$ | Transmittance T(%) | | |
| OT | 0.98 | 1.52 | 1.07 | 1.52 | 1.06 | 1.52 | 0.84 | 0.29 | 99.65 | | |
| Ten-layer film | $ThF_4$ | $AlF_3$ | $ThF_4$ | $AlF_3$ | $ThF_4$ | $AlF_3$ | $ThF_4$ | $AlF_3$ | $ThF_4$ | $AlF_3$ | Transmittance T(%) |
| OT | 0.34 | 1.83 | 0.78 | 1.85 | 0.81 | 1.79 | 0.85 | 1.73 | 0.74 | 0.29 | 99.72 |

NOTE)
OT represents an optical film thickness measured in terms of one-quarter of a wavelength $\lambda$(193 nm), i.e., ($\lambda/4$).

TABLE 4

In the case of AR film 73° for incidence

| Two-layer film | ThF$_4$ | AlF$_3$ | Transmittance T(%) | | | | | | | |
|---|---|---|---|---|---|---|---|---|---|---|
| OT | 0.93 | 0.29 | 93.63 | | | | | | | |
| Four-layer film | ThF$_4$ | AlF$_3$ | ThF$_4$ | AlF$_3$ | Transmittance T(%) | | | | | |
| OT | 1.20 | 1.39 | 0.93 | 0.29 | 95.65 | | | | | |
| Six-layer film | ThF$_4$ | AlF$_3$ | ThF$_4$ | AlF$_3$ | ThF$_4$ | AlF$_3$ | Transmittance T(%) | | | |
| OT | 1.19 | 1.39 | 1.21 | 1.39 | 0.93 | 0.29 | 97.28 | | | |
| Eight-layer film | ThF$_4$ | AlF$_3$ | ThF$_4$ | AlF$_3$ | ThF$_4$ | AlF$_3$ | ThF$_4$ | AlF$_3$ | Transmittance T(%) | |
| OT | 1.18 | 1.41 | 1.19 | 1.41 | 1.19 | 1.41 | 0.93 | 0.29 | 98.46 | |
| Ten-layer film | ThF$_4$ | AlF$_3$ | ThF$_4$ | AlF$_3$ | ThF$_4$ | AlF$_3$ | ThF$_4$ | AlF$_3$ | ThF$_4$ | AlF$_3$ | Transmittance T(%) |
| OT | 1.13 | 1.45 | 1.16 | 1.45 | 1.16 | 1.45 | 1.15 | 1.45 | 0.90 | 0.29 | 99.2 |

NOTE) OT represents an optical film thickness measured in terms of one-quarter of a wavelength λ(193 nm), i.e., (λ/4).

TABLE 5

In the case of AR film for 75° incidence

| Two-layer film | ThF$_4$ | AlF$_3$ | Transmittance T(%) | | | | | | | |
|---|---|---|---|---|---|---|---|---|---|---|
| OT | 0.94 | 0.29 | 90.63 | | | | | | | |
| Four-layer film | ThF$_4$ | AlF$_3$ | ThF$_4$ | AlF$_3$ | Transmittance T(%) | | | | | |
| OT | 1.21 | 1.39 | 0.95 | 0.29 | 92.93 | | | | | |
| Six-layer film | ThF$_4$ | AlF$_3$ | ThF$_4$ | AlF$_3$ | ThF$_4$ | AlF$_3$ | Transmittance T(%) | | | |
| OT | 1.21 | 1.39 | 1.22 | 1.39 | 0.95 | 0.29 | 94.91 | | | |
| Eight-layer film | ThF$_4$ | AlF$_3$ | ThF$_4$ | AlF$_3$ | ThF$_4$ | AlF$_3$ | ThF$_4$ | AlF$_3$ | Transmittance T(%) | |
| OT | 1.20 | 1.40 | 1.21 | 1.40 | 1.21 | 1.40 | 0.94 | 0.29 | 96.55 | |
| Ten-layer film | ThF$_4$ | AlF$_3$ | ThF$_4$ | AlF$_3$ | ThF$_4$ | AlF$_3$ | ThF$_4$ | AlF$_3$ | ThF$_4$ | AlF$_3$ | Transmittance T(%) |
| OT | 1.19 | 1.41 | 1.20 | 1.41 | 1.20 | 1.42 | 1.20 | 1.42 | 0.93 | 0.29 | 97.82 |

NOTE) OT represents an optical film thickness measured in terms of one-quarter of a wavelength λ(193 nm), i.e., (λ/4).

The transmittances of prisms obtained by forming the antireflection film for 0° incidence shown in Table 2 and the antireflection films for oblique incidence shown in Tables 3–5 on two faces of a prism base member of calcium fluoride as shown in FIG. 1 were calculated. The result is shown in Table 6.

TABLE 6

| | AR film for 0° incidence | | | | |
|---|---|---|---|---|---|
| | Two-layer film | Three-layer film | Four-layer film | Five-layer film | Six-Layer film |
| AR film with p polarization for 70° incidence | 99.49 | 99.92 | 99.91 | 99.92 | 99.9 |
| Two-layer film | 96.67 | 96.18 | 96.10 | 96.58 | 96.59 | 96.57 |
| Four-layer film | 98.22 | 97.72 | 98.14 | 98.13 | 98.14 | 98.12 |
| Six-layer film | 99.22 | 98.71 | 99.14 | 99.13 | 99.14 | 99.12 |
| Eight-layer film | 99.65 | 99.14 | 99.57 | 99.56 | 99.57 | 99.55 |
| Ten-layer film | 99.72 | 99.21 | 99.64 | 99.63 | 99.64 | 99.62 |

TABLE 6-continued

| | AR film for 0° incidence | | | | |
|---|---|---|---|---|---|
| | Two-layer film | Three-layer film | Four-layer film | Five-layer film | Six-Layer film |
| AR film with p polarization for 73° incidence | | | | | |
| Two-layer film | 93.63 | 93.15 | 93.56 | 93.55 | 93.56 | 93.54 |
| Four-layer film | 95.65 | 95.16 | 95.57 | 95.56 | 95.57 | 95.55 |
| Six-layer film | 97.28 | 96.78 | 97.20 | 97.19 | 97.20 | 97.18 |
| Eight-layer film | 98.46 | 97.96 | 98.38 | 98.37 | 98.38 | 98.36 |
| Ten-layer film | 99.2 | 98.69 | 99.12 | 99.11 | 99.12 | 99.10 |
| AR film with p polarization for 75° incidence | | | | | |
| Two-layer film | 90.63 | 90.17 | 90.56 | 90.55 | 90.56 | 90.54 |
| Four-layer film | 92.93 | 92.46 | 92.86 | 92.85 | 92.86 | 92.84 |
| Six-layer | 94.91 | 94.43 | 94.83 | 94.82 | 94.83 | 94.82 |

TABLE 6-continued

| | AR film for 0° incidence | | | | |
|---|---|---|---|---|---|
| | Two-layer film | Three-layer film | Four-layer film | Five-layer film | Six-Layer film |
| film | | | | | |
| Eight-layer film | 96.55 | 96.06 | 96.47 | 96.46 | 96.47 | 96.45 |
| Ten-layer film | 97.82 | 97.32 | 97.74 | 97.73 | 97.74 | 97.72 |

For example, in the case of 73° incidence, three enlargement prisms are required in the resonator under the condition for narrowing the band (the condition of half-value width of an oscillation line with a wavelength of 193 nm). Accordingly, if one prism has transmittance T, the total transmittance of three combined prisms would be $(T)^6$ since light would be transmitted through six prisms by one round trip in the resonator. For example, if the antireflection film for 73° incidence includes eight layers and the antireflection film for 0° incidence includes three layers in the prism of the present invention, the transmittance would be 98.38% (0.9838) based on the design value of Table 6. If three such prisms are used in the resonator, the total transmittance of the combined prisms would be $(0.9838)^6 = 0.907$. By contrast, one conventional prism with the antireflection film including a lanthanum fluoride layer and magnesium fluoride layer has a transmittance of at most 96% (0.960). If three such prisms are used in the resonator, the total transmittance of the combined prisms would be $(0.960)^6 = 0.783$. The total transmittance of the combined prisms contributes to the output of the excimer laser light source. Thus, by using the prism of the present invention as an enlargement prism in the resonator for the purpose of narrowing wavelength of the laser beam with a wavelength of 193 nm, the laser output would be higher by an amount corresponding to the increase in transmittance, i.e., by about 16%, than in the case of the conventional prism. As a result, the laser beam band can be effectively narrowed while restraining the power loss and without decreasing laser energy efficiency.

To verify the transmitting performance of the prism of the present invention, antireflection films are formed on two faces of a base member of a right-angle prism as shown in FIG. 1. The prism had a vertical angle of 39.6° and an oblique face with an incident angle of 73°. The prism base member included calcium fluoride. In prism 1 shown in FIG. 1, a two-layer film shown in Table 2 was formed as the structure of antireflection film for 0° incidence 30, and two types of prisms, respectively including six-layer film and eight-layer film shown in Table 4 (in the case of the antireflection (AR) film for 73° incidence) as structures of antireflection films for oblique incident 20, were formed.

Figure 5:
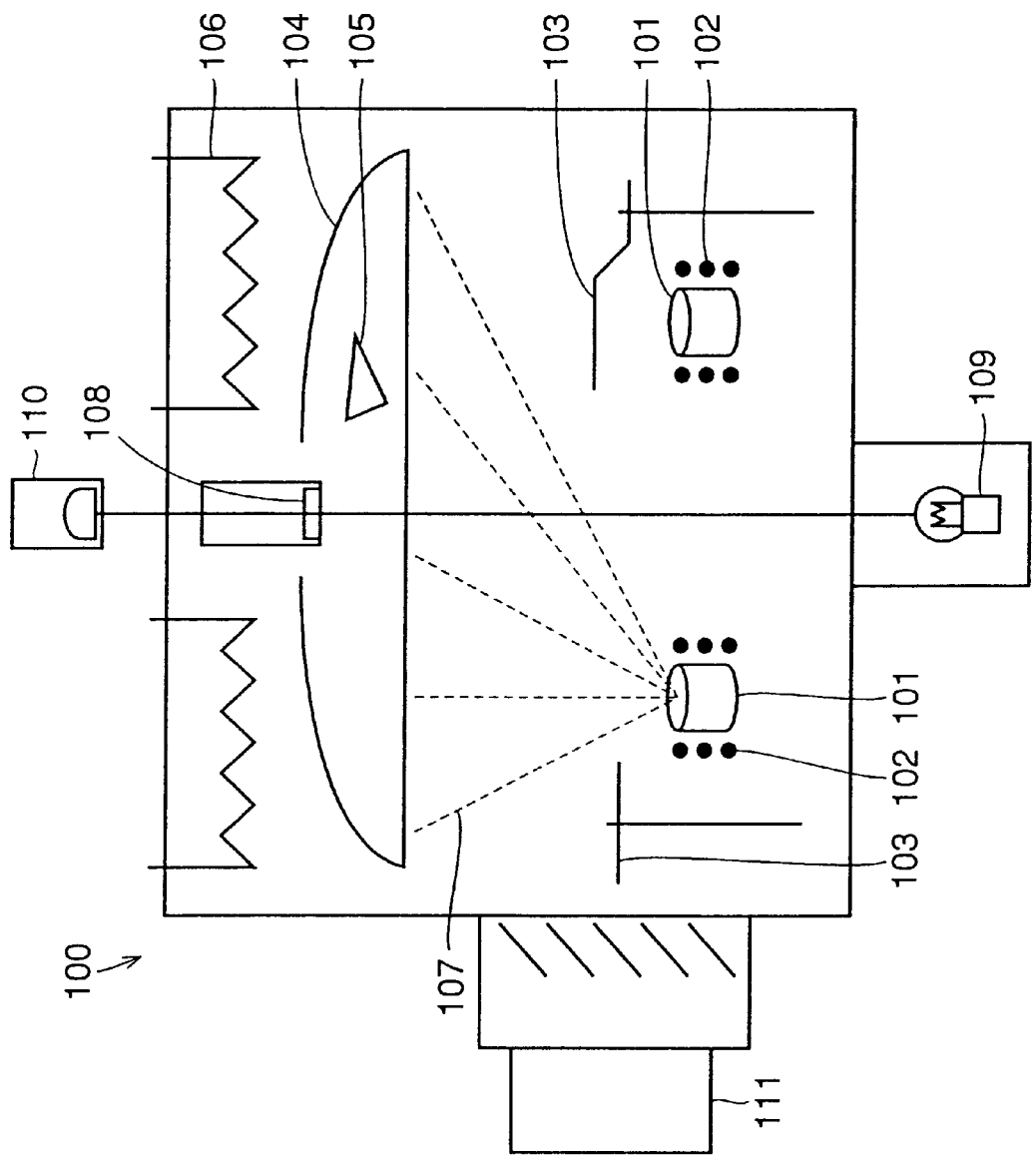
FIG. 5 is a schematic diagram showing a vacuum deposition apparatus used for forming the antireflection of the present invention.

A vapor deposition apparatus was employed for forming the antireflection film. FIG. 5 is a schematic diagram showing the vapor deposition apparatus.

As shown in FIG. 5, a molybdenum (Mo) crucible 101 is provided in a chamber of vapor deposition apparatus 100. A film material is introduced into crucible 101. A heater for resistive heating 102 is provided around crucible 101. The film material in crucible 101 is heated by heater for resistive heating 102. A dome for vapor deposition 104 is arranged opposite to crucible 101. Prism base member 105 is held by a dedicated holder, which is arranged in dome for vapor deposition 104. Dome for vapor deposition 104 is adapted to make revolution. A heater for heating the base member 106 is provided for heating the base member which will be subjected to vapor deposition. The film material in heated crucible 101 evaporates as shown by dotted lines 107 for deposition onto the surface of prism base member 105 arranged in rotating dome for vapor deposition 104.

A shutter 103 is used for alternate vapor deposition. The top of one of two crucibles 101 containing different film materials is exposed by shutter 103 and the top of the other crucible 103 is covered by shutter 103, so that the film material in one crucible 101 evaporates for deposition onto the surface of prism base member 105 arranged in dome for vapor deposition 104. Thereafter, in the opposite manner, the top of the other crucible 101 is exposed by shutter 103 and the top of one crucible 101 is covered by shutter 103, so that the film material in the other crucible 101 evaporates for deposition onto the surface of prism base member 105 arranged in dome for vapor deposition 104. Thus, two types of different films are layered by alternately depositing different types of film materials.

Dome for vapor deposition 104 has a glass for monitoring optical film thickness 108. Light is emitted from a light emitting portion for monitoring optical film thickness 109, transmitted through the film formed on the surface of glass for monitoring optical film thickness 108, and received by a light receiving portion for monitoring optical film thickness 110. In this way, the film deposited on the surface of glass for monitoring optical film thickness 108 is monitored for controlling the thickness of the film formed on the surface of prism base member 105. The chamber of vapor deposition apparatus 100 is evacuated by a vacuum pumping system 111 to have a prescribed vacuum. Vacuum pumping system 111 is formed with a turbo-molecular pump, oil diffusion pump, or cryopump.

The above described vacuum deposition apparatus employs a resistive heating method in which a molybdenum crucible is used. Alternatively, the film material may be heated by an electron-beam heating method using a water-cooled crucible of copper for evaporation.

In the film formation, the base member was maintained at a temperature of 250–350° C., the chamber had a vacuum of $6 \times 10^{-6}$ mbar, and the deposition speed was at most 20 nm/minute and preferably 2–3 nm/minute in both cases of thorium fluoride and aluminum fluoride layers to ensure accuracy in controlling the film thickness.

Figure 4:
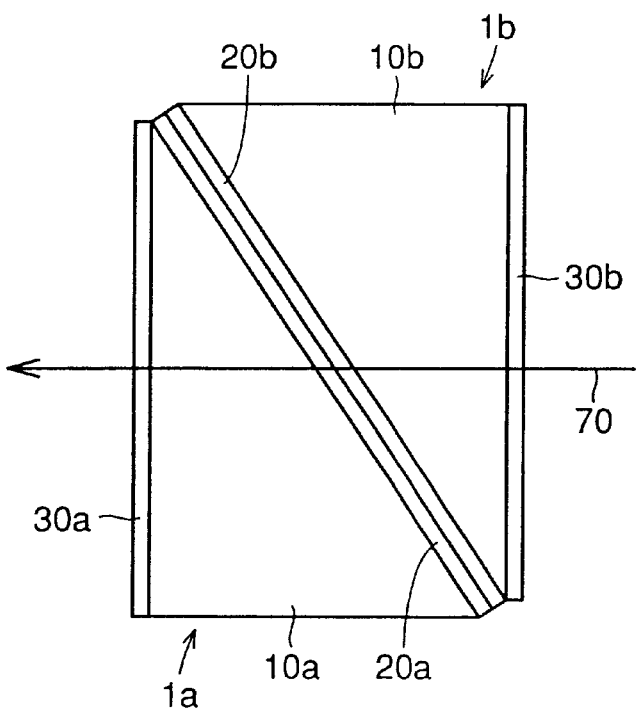
FIG. 4 is a cross sectional view schematically showing combined prisms used for measuring transmittance.

Combined prisms were manufactured with use of thus formed two types of different prisms. FIG. 4 is a cross sectional view schematically showing the structure of the combined prisms.

As shown in FIG. 4, a prism 1a has an antireflection film for oblique incidence 20a and an antireflection film for 0° incidence 30a, respectively formed on two faces of a prism base member 10a. A prism 1b has an antireflection film for oblique incidence 20b and an antireflection film for 0° incidence 30b, respectively formed on two faces of a prism base member 10b. Prisms 1a and 1b are combined such that antireflection films for oblique incidence 20a and 20b are in contact with each other, to form combined prisms.

With use of the combined prisms, transmittance was measured by directing linear polarization from the 0° incident surface in the direction indicated by an arrow 70 of FIG. 4 to provide p polarization in the oblique face at the middle portion. This method enables accurate measurement without causing light displacement.

A spectrophotometer and ArF laser light source were used as a light source. In the case of using the spectrophotometer, transmittance was calculated based on a ratio of intensity of light after passing through the above mentioned combined prisms, to a blank light intensity (transmittance of 100%) with a wavelength of 193 nm, as measured by a double beam measuring system using a polarizer for ultraviolet rays. In the case of ArF laser light source, the ArF light source was linearly polarized and, transmittance was calculated based on a ratio of intensity of light after passing through the above mentioned combined prisms with respect to the intensity of light in the linearly polarized state.

Based on the calculated transmittance of the combined prisms, the transmittance of one prism was calculated in the following way.

If there are three prisms A, B, and C of which transmittances are to be measured (TA, TB, and TC are respectively transmittances of these prisms), transmittances of three combined prisms (T1, T2, T3) are expressed as follows.

T1=TA*TB
T2=TB*TC
T3=TC*TA

From the above equations, the transmittance of each prism can be obtained in accordance with the following equations.

$TA=(T1*T3/T2)^{1/2}$
$TB=(T1*T2/T3)^{1/2}$
$TC=(T2*T3/T1)^{1/2}$

Thus, at least three prisms are required to calculate the transmittance of each prism based on the measured transmittance of the combined prisms.

The transmittances of two types of prisms found in the above method were 96.3% for the prism with the antireflection film having the structure of two layers for 0° incidence and six layers for 73° incidence, and 97.5% for the prism with the antireflection film having the structure of two layers for 0° incidence and eight layers for 73° incidence. It was confirmed that these measured transmittances were approximately the same as the designed values shown in Table 6.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A prism, comprising:
   a base member having first and second faces intersecting with each other, said base member including calcium fluoride;
   a first antireflection film formed on the first face of said base member; and
   a second antireflection film formed on the second face of said base member,
   each of said first and second antireflection films having a high-refractive-index layer with a relatively high refractive index and a low-refractive-index layer with a relatively low refractive index, said high refractive-index layer including thorium fluoride, and said low-refractive-index layer including aluminum fluoride, wherein
   each of said first and second antireflection films includes alternately layered said high-refractive-index layer and said low-refractive-index layer, and
   said first antireflection film includes an even number of layers, said high-refractive-index layer is arranged immediately on the first face of said base member, and said low-refractive-index layer is arranged at an outermost surface of said first antireflection film.

2. The prism according to claim 1, wherein said first antireflection film includes first and second layers successively formed on said base member, and said first and second layers respectively have optical film thicknesses of 0.88λ/4–0.95λ/4 and 0.29λ/4–0.32λ/4 with respect to any design basis wavelength λ of at most 200 nm.

3. The prism according to claim 1, wherein said first antireflection film includes first to fourth layers successively formed on said base member, and said first to fourth layers respectively have optical film thicknesses of 1.15λ/4–1.22λ/4, 1.37λ/4–1.40λ/4, 0.88λ/4–0.96λ/4, and 0.29λ/4–0.32λ/4 with respect to any design basis wavelength λ of at most 200 nm.

4. The prism according to claim 1, wherein said first antireflection film includes first to sixth layers successively formed on said base member, and said first to sixth layers respectively have optical film thicknesses of 1.02λ/4–1.22λ/4, 1.39λ/4–1.47λ/4, 1.08λ/4–1.22λ/4, 1.39λ/4–1.48λ/4, 0.84λ/4–0.95λ/4, and 0.29λ/4–0.32λ/4 with respect to any design basis wavelength λ of at most 200 nm.

5. The prism according to claim 1, wherein said first antireflection film includes first to eighth layers successively formed on said base member, and said first to eighth layers respectively have optical film thicknesses of 0.34λ/4–1.21λ/4, 1.40λ/4–1.70λ/4, 0.80λ/4–1.22λ/4, 1.40λ/4–1.80λ/4, 0.79λ/4–1.22λ/4, 1.40λ/4–1.81λ/4, 0.70λ/4–0.95λ/4, and 0.29λ/4–0.32λ/4 with respect to any design basis wavelength λ of at most 200 nm.

6. The prism according to claim 1, wherein said first antireflection film includes first to tenth layers successively formed on said base member, and said first to tenth layers respectively have optical film thicknesses of 0.34λ/4–1.20λ/4, 1.41λ/4–1.94λ/4, 0.45λ/4–1.21λ/4, 1.41λ/4–2.20λ/4, 0.49λ/4–1.21λ/4, 1.42λ/4–2.09λ/4, 0.58λ/4–1.20λ/4, 1.42λ/4–1.99λ/4, 0.63λ/4–0.94λ/4, and 0.29λ/4–0.32λ/4 with respect to any design basis wavelength λ of at most 200 nm.

7. The prism according to claim 1, wherein said prism is a right-angle prism.

8. The prism according to claim 1, wherein light with an incident angle of 65–80° is incident upon the first face of said base member, and light with an incident angle of 0° is incident upon the second face of said base member.

9. An optical device using the prism according to claim 1 as an optical element for narrowing a wavelength band of an excimer laser beam with a wavelength of at most 200 nm.

10. The optical device according to claim 9, wherein said optical device is a laser resonator.

11. A prism, comprising:
   a first antireflection film formed on the first face of said base member; and
   a second antireflection film formed on the second face of said base member,
   each of said first and second antireflection films having a high-refractive-index layer with a relatively high refractive index and a low-refractive-index layer with a relatively low refractive index, said high refractive-index layer including thorium fluoride, and said low-refractive-index layer including aluminum fluoride
   each of said first and second antireflection films includes alternately layered said high-refractive-index layer and said low-refractive-index layer, wherein said second antireflection film includes an even number of layers, said high-refractive-index layer is arranged immediately on the second face of said base member, and said low-refractive-index layer is arranged at an outermost surface of said second antireflection film.

12. The prism according to claim 11, wherein said second antireflection film includes first and second layers successively formed on said base member, and said first and second layers respectively have optical film thicknesses of $0.95\lambda/4$–$1.01\lambda/4$ and $0.98\lambda/4$–$1.04\lambda/4$ with respect to any design basis wavelength $\lambda$ of at most 200 nm.

13. The prism according to claim 11, wherein said second antireflection film includes first to fourth layers successively formed on said base member, and said first to fourth layers respectively have optical film thicknesses of $0.66\lambda/4$–$0.70\lambda/4$, $0.79\lambda/4$–$0.83\lambda/4$, $0.66\lambda/4$–$0.70\lambda/4$, and $1.30\lambda/4$–$1.35\lambda/4$ with respect to any design basis wavelength $\lambda$ of at most 200 nm.

14. The prism according to claim 11, wherein said prism is a right-angle prism.

15. The prism according to claim 11, wherein light with an incident angle of 65–80° is incident upon the first face of said base member, and light with an incident angle of 0° is incident upon the second face of said base member.

16. An optical device using the prism according to claim 11 as an optical element for narrowing a wavelength band of an excimer laser beam with a wavelength of at most 200 nm.

17. The optical device according to claim 16, wherein said optical device is a laser resonator.

18. A prism, comprising:
a base member having first and second faces intersecting with each other, said base member including calcium fluoride;
a first antireflection film formed on the first face of said base member; and
a second antireflection film formed on the second face of said base member,
each of said first and second antireflection films having a high-refractive-index layer with a relatively high refractive index and a low-refractive-index layer with a relatively low refractive index, said high refractive-index layer including thorium fluoride, and said low-refractive-index layer including aluminum fluoride
each of said first and second antireflection films includes alternately layered said high-refractive-index layer and said low-refractive-index layer, wherein said second antireflection film includes an odd number of layers, said low-refractive-index-layer is arranged immediately on the second face of said base member, and a second low-refractive-index-layer is arranged at an outermost surface of said second antireflection film, and wherein said second antireflection film includes first to third layers successively formed on said base member, and said first to third layers respectively have optical film thicknesses of $1.38\lambda/4$–$1.46\lambda/4$, $0.80\lambda/4$–$0.84\lambda/4$, and $0.96\lambda/4$–$1.02\lambda/4$ with respect to any design basis wavelength $\lambda$ of at most 200 nm.

19. The prism according to claim 18, wherein said prism is a right-angle prism.

20. The prism according to claim 18, wherein light with an incident angle of 65–80° is incident upon the first face of said base member, and light with an incident angle of 0° is incident upon the second face of said base member.

21. An optical device using the prism according to claim 18 as an optical element for narrowing a wavelength band of an excimer laser beam with a wavelength of at most 200 nm.

22. The optical device according to claim 21, wherein said optical device is a laser resonator.

23. A prism, comprising:
a base member having first and second faces intersecting with each other, said base member including calcium fluoride;
a first antireflection film formed on the first face of said base member; and
a second antireflection film formed on the second face of said base member,
each of said first and second antireflection films having a high-refractive-index layer with a relatively high refractive index and a low-refractive-index layer with a relatively low refractive index, said high refractive-index layer including thorium fluoride, and said low-refractive-index layer including aluminum fluoride
each of said first and second antireflection films includes alternately layered said high-refractive-index layer and said low-refractive-index layer, wherein said second antireflection film includes an odd number of layers, said low-refractive-index-layer is arranged immediately on the second face of said base member, and a second low-refractive-index-layer is arranged at an outermost surface of said antireflection film, and wherein said second antireflection film includes first to fifth layers successively formed on said base member, and said first to fifth layers respectively have optical film thicknesses of $2.07\lambda/4$–$2.19\lambda/4$, $0.33\lambda/4$–$0.35\lambda/4$, $1.55\lambda/4$–$1.65\lambda/4$, $0.76\lambda/4$–$0.80\lambda/4$, and $0.98\lambda/4$–$1.04\lambda/4$ with respect to any design basis wavelength $\lambda$ of at most 200 nm.

24. The prism according to claim 23, wherein said prism is a right-angle prism.

25. The prism according to claim 23, wherein light with an incident angle of 65–80° is incident upon the first face of said base member, and light with an incident angle of 0° is incident upon the second face of said base member.

26. An optical device using the prism according to claim 23 as an optical element for narrowing a wavelength band of an excimer laser beam with a wavelength of at most 200 nm.

27. The optical device according to claim 26, wherein said optical device is a laser resonator.

28. A prism, comprising:
a base member having first and second faces intersecting with each other, said base member including calcium fluoride;
a first antireflection film formed on the first face of said base member; and
a second antireflection film formed on the second face of said base member,
each of said first and second antireflection films having a high-refractive-index layer with a relatively high refractive index and a low-refractive-index layer with a relatively low refractive index, said high refractive-index layer including thorium fluoride, and said low-refractive-index layer including aluminum fluoride
each of said first and second antireflection films includes alternately layered said high-refractive-index layer and said low-refractive-index layer, wherein said first antireflection film includes any number of layers selected from a group of two, four, six, eight, and ten layers, said high-refractive-index layer is arranged immediately on the first face of said base member, said low-refractive-index layer is arranged at an outermost surface of said first antireflection film, said second antireflection film includes any number of layers selected from a group of two, three, four, and five layers, and said low-refractive-index layer is arranged at an outermost surface of said second antireflection film.

29. The prism according to claim 28, wherein said prism is a right-angle prism.

30. The prism according to claim 18, wherein light with an incident angle of 65–80° is incident upon the first face of said base member, and light with an incident angle of 0° is incident upon the second face of said base member.

31. An optical device using the prism according to claim 28 as an optical element for narrowing a wavelength band of an excimer laser beam with a wavelength of at most 200 nm.

32. The optical device according to claim 31, wherein said optical device is a laser resonator.

* * * * *

UNITED STATES PATENT AND TRADEMARK OFFICE
CERTIFICATE OF CORRECTION

PATENT NO. : 6,501,598 B2
DATED : December 31, 2002
INVENTOR(S) : Hiromi Iwamoto It is certified that error appears in the above-identified patent and that said Letters Patent is hereby corrected as shown below:

<u>Title page,</u>
Item [73], Assignee, change "Sumitomo Electric Industries, Tld., Osaka (JP)" to
-- Sumitomo Electric Industries, Ltd., Osaka (JP) --

Signed and Sealed this

Twenty-fifth Day of March, 2003

JAMES E. ROGAN
*Director of the United States Patent and Trademark Office*